(12) United States Patent
Wang et al.

(10) Patent No.: US 6,996,637 B2
(45) Date of Patent: *Feb. 7, 2006

(54) ARRAY CONFIGURATION FOR MULTIPLE DISK-ARRAY SYSTEM

(75) Inventors: Jerry Wang, Taipei (TW); Wilson Hu, Taipei (TW)

(73) Assignee: Via Technologies, Inc., Taipei (TW)

( * ) Notice: Subject to any disclaimer, the term of this patent is extended or adjusted under 35 U.S.C. 154(b) by 139 days.

This patent is subject to a terminal disclaimer.

(21) Appl. No.: 10/617,857

(22) Filed: Jul. 14, 2003

(65) Prior Publication Data

US 2004/0117551 A1 Jun. 17, 2004

(30) Foreign Application Priority Data

Dec. 12, 2002 (TW) .............................. 91135913 A

(51) Int. Cl.
  *G06F 13/00* (2006.01)
(52) U.S. Cl. .............................. 710/8; 710/62; 710/74; 711/114; 711/170
(58) Field of Classification Search .................. 710/8, 710/10, 62, 72, 74; 711/114, 110, 154, 170; 714/5–7, 770
See application file for complete search history.

(56) References Cited

U.S. PATENT DOCUMENTS

| | | | | |
|---|---|---|---|---|
| 5,950,230 A | * | 9/1999 | Islam et al. .................. | 711/156 |
| 6,742,081 B2 | * | 5/2004 | Talagala et al. ............. | 711/114 |
| 6,799,284 B1 | * | 9/2004 | Patel et al. .................... | 714/6 |

* cited by examiner

*Primary Examiner*—Kim Huynh
(74) *Attorney, Agent, or Firm*—Rosenberg, Klein & Lee

(57) ABSTRACT

An array configuration is provided for a multiple disk-arrays system containing at least one disk array. The array configuration comprises an array signature field, an array information, a disk information and a serial check sum of each disk in the same disk array. The array configuration is stored at the last sector of each disk in the multiple disk-arrays system. The array signature field identifies a disk in the disk array or in a span array. The array information is used for recording at least one setting and at least one status of the disk array. The disk information is used for recording at least one information in each disk of each disk array. The serial check sum of each disk in the same disk array is used to identify array status.

21 Claims, 4 Drawing Sheets

| offset | type | meaning |
|---|---|---|
| 0 | WORD | array signature |
| 2 | BYTE | version identification |
| 3 | 15bytes | array information/disk information |
| 18 | DWORD | serial check sum of array disk 0 |
| 22 | DWORD | serial check sum of array disk 1 |
| 26 | DWORD | serial check sum of array disk 2 |
| 30 | DWORD | serial check sum of array disk 3 |
| 34 | DWORD | serial check sum of array disk 4 |
| 38 | DWORD | serial check sum of array disk 5 |
| 42 | DWORD | serial check sum of array disk 6 |
| 46 | DWORD | serial check sum of array disk 7 |
| 50 | BYTE | serial check sum of array configuration |

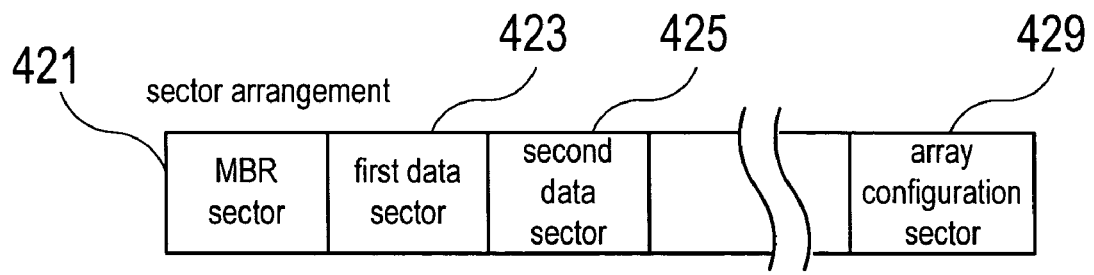

FIG. 4

| offset | type | meaning |
|---|---|---|
| 0 | WORD | array signature |
| 2 | BYTE | version identification |
| 3 | 15bytes | array information/disk information |
| 18 | DWORD | serial check sum of array disk 0 |
| 22 | DWORD | serial check sum of array disk 1 |
| 26 | DWORD | serial check sum of array disk 2 |
| 30 | DWORD | serial check sum of array disk 3 |
| 34 | DWORD | serial check sum of array disk 4 |
| 38 | DWORD | serial check sum of array disk 5 |
| 42 | DWORD | serial check sum of array disk 6 |
| 46 | DWORD | serial check sum of array disk 7 |
| 50 | BYTE | serial check sum of array configuration |

FIG. 5 array information

| bit | array type | meaning | |
|---|---|---|---|
| 0-2 | Raid 0 | disk number | |
| | Raid 1 | spare disk number | |
| | Raid 0+1 | stripe disk number | |
| | Span | disk number | |
| 3 | all | array broken flag | |
| 4-7 | Raid 0 - Raid 7 | 0-7 | representative value |
| | Span | 8 | |
| | Raid 0+1 | 9 | |
| 8-10 | all | array serial number | |
| 11-14 | including stripe disk | stripe size | |
| 15-46 | all | available capacity | |
| 47-63 | all | reserved bit | |

FIG. 6 disk information

| bit | array type | meaning | |
|---|---|---|---|
| 0 | all | boot | |
| 1 | all | enhanced | |
| 2-33 | all | serial check sum | |
| 34-38 | Raid 0 | sequence of stripe disk | sequence/ function field |
| 34-35 | Raid 1 | source, mirror, or spare disk | |
| 36 | Raid 1 | synchronization | |
| 34-36 | Raid 0+1 | sequence of stripe disk | |
| 37 | Raid 0+1 | source array or mirror array | |
| 38 | Raid 0+1 | synchronization | |
| 34-36 | Span | sequence of disk | |
| 39-55 | all | reserved bit | |

FIG. 7

ARRAY CONFIGURATION FOR MULTIPLE DISK-ARRAY SYSTEM

BACKGROUND OF THE INVENTION

1. Field of the Invention

The present invention relates to an array configuration for managing disk in disk array, more particularly to an array configuration for multiple disk-array system, wherein the array configuration is placed at the last sector of a disk in a disk array to render the disk with more flexible usage.

2. Description of Related Art

The rapid market growth of information products has urged the development of new technologies and new specifications in information industry. As to data storage device, the data transfer rate and data safety are important issues. Therefore, RAID (redundant array of independent disk) is proposed to meet above demands. RAID 0 (Redundant Arrays of Inexpensive Disks level 0) array provides the function of data striping to boost the data access speed. RAID 1 array provides the function of data mirroring to ensure security and safety of data storage and system stability. In addition, RAID 0+1 array, a combination of RAID 0 array plus RAID 1 array, has advantages in both data transfer speed and data security.

FIG. 1 shows a schematic view of a disk array 14 connected to a computer 12. The disk array 14 mainly comprises a disk-array controller 141, a plurality of disk drives including a first disk drive 161, a second disk drive 162, a third disk drive 165 and a fourth disk drive 167, connected to the computer 12 through the disk-array controller 141. Similarly, the computer 12 accesses the plurality of disk drives through the disk-array controller 141.

In prior art disk array, the disk of each disk driver has a sector arrangement as shown in FIG. 2. The first sector of each driver is configured as an array configuration sector 221 for the disk driver in which the configuration of the disk array is stored. The sector next to the array configuration sector 221 is configured as MBR (master boot record) sector 223. The remaining sectors are configured into a plurality of data sectors begun from a first data sector 225 and ended by a last data sector 229.

The disk array architecture and sector arrangement described above are only feasible for single disk array system and are problematic for multiple disk-array system (a system with multiple disk arrays). The placement of array configuration sector in first sector of the disk precludes the possibility for stand-alone use. Once being removed from the disk array, the data in the disk cannot be accessed.

SUMMARY OF THE INVENTION

It is an object of the invention to provide an array configuration for multiple disk-array system to provide more flexible use for disk of the system.

In one aspect of the invention, an array signature field, an array information and a disk information are stored in last sector of a disk in this system. A disk can be added to or removed from a disk array while the original data is safely kept.

In another aspect of the invention, serial check sum of each disk in the same disk array is stored in the array configuration to fast identify status of disk array and relationship among the disks.

In still another aspect of the invention, the array configuration is well organized to save disk space.

To achieve above object and aspects, the array configuration of the present invention comprises an array signature field for identifying a disk relevant to one of disk arrays and span arrays, an array information for recording at least one setting and at least one status on the disk array; a disk information for recording at least one information in each disk of each disk array; and a serial check sum of each disk in same disk array.

The various objects and advantages of the present invention will be more readily understood from the following detailed description when read in conjunction with the appended drawing, in which:

BRIEF DESCRIPTION OF DRAWINGS

FIG. 4 shows the sector arrangement for each disk in the multiple disk-arrays system;

FIG. 5 shows the array configuration according to the present invention;

FIG. 6 shows the array information for each bit therein according to the present invention; and FIG. 7 shows the disk information for each bit therein according to the present invention.

DETAILED DESCRIPTION OF THE INVENTION

Figure 1:
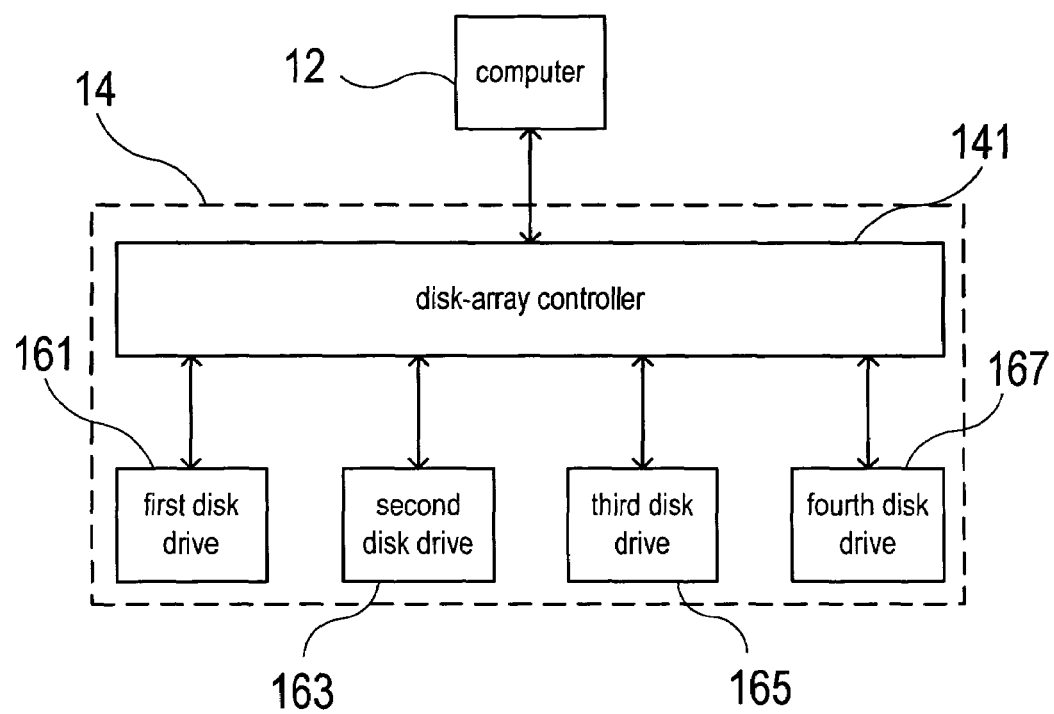
FIG. 1 shows a schematic view of prior art disk array.
Figure 2:
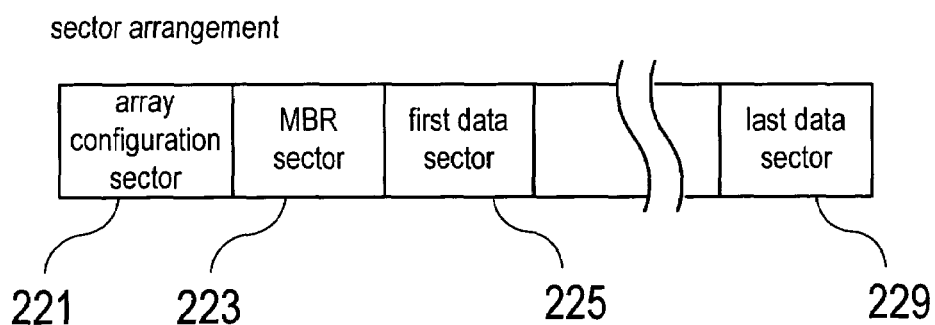
FIG. 2 shows the sector arrangement of prior art disk array.
Figure 3:
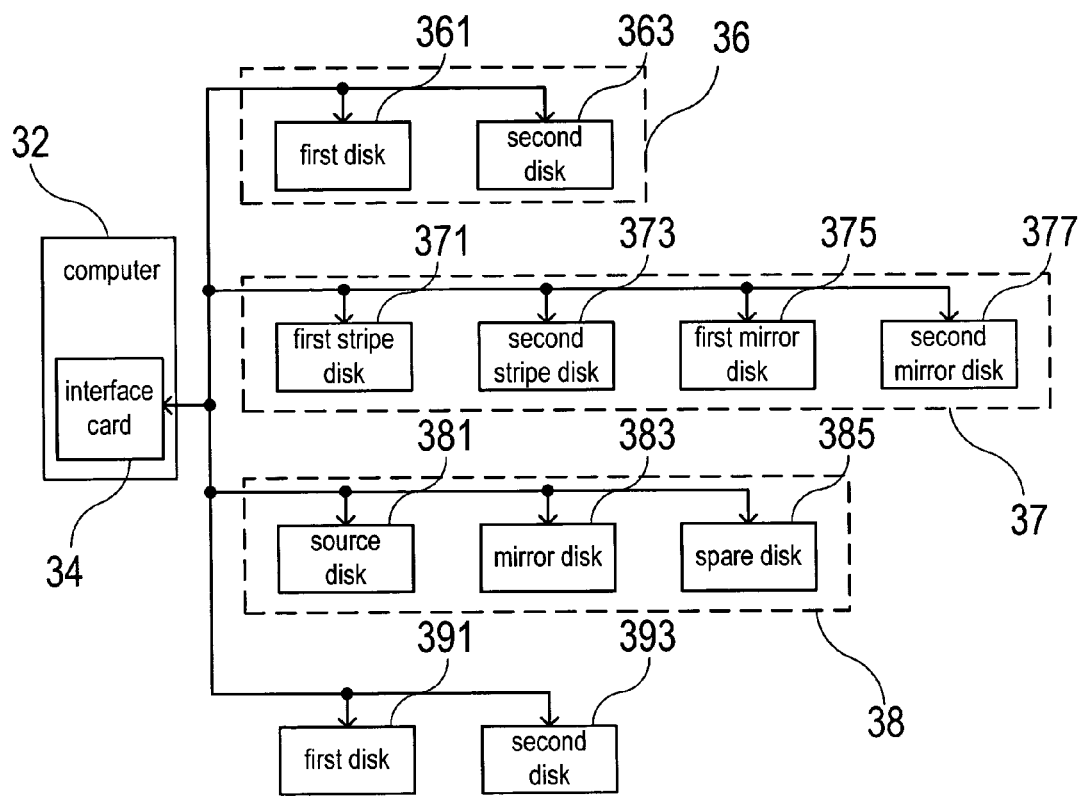
FIG. 3 shows a schematic block diagram of a multiple disk-array system.

FIG. 3 shows a schematic block diagram of a multiple disk-array system used to explain the array configuration for multiple disk-array system according to the present invention. FIG. 4 shows the sector arrangement for each disk in the multiple disk-arrays system. In this system, a computer 32 is connected to a plurality of disk arrays and a plurality of independent disk drives in a span array through an interface card 34. The plurality of disk arrays includes a first disk array 36, a second disk array 37 and a third disk array 38. To access data in the disks of the disk arrays or the span array, the computer firstly finds an accessing address of the data in corresponding disk, and then accesses the disks of the disk arrays or the span array through the adaptor card 34.

The plurality of disk arrays can be disk arrays of the same category or disk arrays of different categories. The first disk array 36 is a RAID 0 array which includes a first stripe disk 361 and a second stripe disk 363. The second disk array 37 is a RAID 0+1 array, which comprises a first stripe disk 371, a second stripe disk 373, a first mirror disk 375, and a second mirror disk 377. The third disk array 18 is a RAID 1 array, which comprises a source disk 381, a mirror disk 383, and a spare disk 385. The disk drives in the span array include a first disk drive 391 and a second disk drive 393.

In sector arrangement of disk in prior disk array system, the first sector is configured as the array configuration sector. In the present invention, the first sector is configured as the MBR sector, and following sectors are first data sector 423, second data sector 425, etc. In the present invention, the last sector for each disk in the disk array is array configuration sector and used for storing array configuration.

When a data is to be written in to a disk, the sectors at front portion of the disk are firstly accessed. Therefore, the last sector has the minimal possibility to access. When the array configuration is stored in the last sector of a disk in a disk array such as RADD 1 array, the disk can be removed and used as independent disk. A disk already stored with data can also be safely added to a disk array such as RADD 1 array. The original data stored in the disk added to the disk array will not be ruined. Therefore, the arrangement of the array configuration in the last sector of a disk renders the disk with flexible usage.

FIG. 5 shows the array configuration, which comprises an array signature field, a version identification field, an array information/disk information, a plurality of serial check sums of every disk in the same disk array, and a serial check sum of the array configuration.

The array signature field is stored in offset 0 position of the array configuration with the data type of one word (16 bits). The array signature field is stored with a specific value (such as AA55h) to identify a disk in a disk array. For example, if one word of data, started from offset 0 of the array configuration stored in the last sector of a disk, is stored with the value AA55h, the disk belongs to a disk array. The version identification field is stored in offset 2 position of the array configuration with the data type of one byte. The version identification field is used to record the version of firmware or software in the disk array system. The array information/disk information is stored in the offset 3 position of the array configuration with the data type of 15 bytes. The array information/disk information is used to record data and status of the disk array and the disks thereof.

The serial check sum of each disk in the same disk array is stored in offset 18, 22, 26, 30, 34, 38, 42, 46 position of the array configuration with the data type of DWORD (double word, 32 bits). The serial check sum of each disk is obtained according to an numeration on the model number, serial number, and firmware revision number of the disk. The serial check sum of each disk is nearly different to each other and can be used to identify the disk in a disk array. Moreover, the data field for serial check sum of disks contains a plurality of serial check sums in the sequence of disks in the disk array. The disks in the same array have the same data field for serial check sum of disks. Therefore, this data field can be used to identity the array. Moreover, the adaptor card 34 can identify the disk array, the sequence, function and relationship of disks in the array by this data field for serial check sum of disks. The removal and damage of disk in the disk array can also be identified by this data field. The serial check sum of array configuration is stored in the offset 50 position of the array configuration with the data type of one byte, which is obtained according to an operation on the entire array configuration to examine the integrity of the array configuration.

FIG. 6 and FIG. 7 respectively depict the array information of each disk array and the disk information of each disk in the array configuration in more detail. The array information uses 8 bytes of data for storing relevant data and status in the disk array. The disk information uses 7 bytes of data for storing relevant data and status in the disk.

In the array information, bits 0–2 denote the disk number field in one disk array, which can be directly expressed by value or other record type according to various array types. In this preferred embodiment, the total disk number is recorded for the RAID 0 array, the spare disk number is recorded for the RAID 1 array, which can be used to estimate the total disk number; the source stripe disk number is recorded for the RAID 0+1 array, which can doubled to compute the total disk number; the total disk number is directly recorded for span array.

Bit 3 denotes an array broken flag, which is binary 1 to denote a normal disk array and is binary 0 to denote an abnormal disk array with removed or damaged disk. Bits 4–7 denote the array type field, for example: RAID 0, RAID 1, . . . , RAID 7 is denoted by values from 0 to 7, whereas other special arrays such as span or RAID 0+1 is denoted by values like 8 or 9.

Bits 8–10 denote the serial number field of each array in the disk system and are used to quickly identify the arrays in an array system. Bits 11–14 denote the size field of recoded data stripe and utilize different values to indicate different data units such as 4k, 8k, 16k, 32k, or 64k. The size of recoded data stripe should be recorded for RAID 0 or RAID 0+1 disk to prevent error. Bits 15–46 denote the available capacity field of each disk in the disk array. For disk array with mirror disk, the available capacity for the array is the smallest available capacity among the mirror disks and source disks to ensure that the mirror disk and source disk have the same available capacity. Bits 47–63 are reserved bits for future use. Especially when the current configuration is not suitable for a disk with very large capacity, the bits 47–63 can be used to denote the capacity of the disk.

In disk information, bit 0 is a boot field and is binary 1 when the disk array has bootable function and is binary 0 when the disk array has not bootable function. Bit 1 is an enhanced field and is binary 1 if a disk array is to be enhanced. Bits 2–33 record the serial check sum of each disk itself.

Bits 34–38 denote the sequence/function field for disk in the disk array. To be specific, in the RAID 0 or span array, it denotes the disk sequence in the array. In the RAID 1 array, bits 34–35 denote the disk being a source, mirror, or spare disk, and bit 36 denotes the necessity for synchronization or not. In the RAID 0+1 array, bits 34–36 record the disk sequence in the stripe array; bit 37 denotes the location of the disk in the source stripe array or the mirror stripe array; bit 38 denotes the necessity for synchronization or not. Moreover, bits 39–55 are reserved bits for future use.

To sum up, the array configuration for multiple disk-array system according to the present invention can be advantageously used to manage the multiple disk-array system. The disk with the inventive array configuration can be used in disk array or span array in flexible way without the risk of data damage.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claim is:

1. An array configuration for a multiple disk-arrays system containing at least one disk array of a plurality of disks, each disk having an array configuration sector comprising:
    an array signature field for identifying said disk as being in said disk array or in a span array;
    an array information field for recording at least one setting and at least one status of said disk array;
    a disk information field for recording at least one information in said disk; and
    a plurality of serial check sum fields respectively corresponding to all of the disks of said disk array, each of said plurality of checksum fields being respectively based on information in said disk information field of a corresponding one of said plurality of disks of said disk array.

2. The array configuration as in claim 1, wherein said array configuration sector is located at a last of a plurality of sectors of said disk in said disk array.

3. The array configuration as in claim 1, further comprising a version identification field used to record a version of firmware and software of said disk array.

4. The array configuration as in claim 1, wherein said array signature field has size of one word (16 bits).

5. The array configuration as in claim 1, wherein said array signature field is a specific value.

6. The array configuration as in claim 1, wherein each of said plurality serial check sum fields of each disk has size of one double word (32 bits).

7. The array configuration as in claim 1, wherein said array information field comprises bits representing an array type, an array disk number and an available disk capacity.

8. The array configuration as in claim 7, wherein said array type is defined by 4 bits and has a specific value to denote a specific array type.

9. The array configuration structure as in claim 7, wherein said array disk number is defined by 3 bits to denote a disk number in a disk array.

10. The array configuration as in claim 7, wherein said available disk capacity is defined by a double word (32 bits) to denote an available disk capacity for each disk in a disk array.

11. The array configuration as in claim 7, wherein said array information field further comprises an array broken flag.

12. The array configuration as in claim 7, wherein said array information field further comprises bits representing a size of a recoded data stripe.

13. The array configuration as in claim 12, wherein 4 bits represent said size of the recorded stripe.

14. The array configuration as in claim 7, wherein said array information field further comprises bits representing a serial number to denote a sequence of arrays in said multiple disk-array system.

15. The array configuration as in claim 14, wherein 3 bits represent said serial number.

16. The array configuration as in claim 1, wherein said disk information field comprises bits representing a boot designation, an enhanced designation, a serial check sum and a disk sequence/function.

17. The array configuration as in claim 16, wherein said serial check sum of said disk information field has a size of 32 bits.

18. The array configuration as in claim 16, wherein said disk sequence/function has size of 5 bits.

19. The array configuration structure as in claim 1, further comprising an array serial check sum field.

20. The array configuration as in claim 19, wherein said array serial check sum field has size of 1 byte.

21. An array configuration for a multiple disk-arrays system containing at least one disk array of a plurality of disks, each disk having an array configuration sector comprising:

an array signature field for identifying a disk in said disk array or in a span array;

an array information field for recording at least one setting and at least one status of said disk array;

a disk information field for recording at least one information in said disk;

a plurality of first serial check sum fields respectively corresponding to all of the disks of said disk array, each of said plurality of first check sum fields being respectively based on a model number, a serial number, and a firmware revision number in said disk information field of a corresponding one said disks in said disk array; and, a second checksum field based on said fields of said array configuration sector.

* * * * *